US012664923B2

(12) United States Patent
Ma et al.

(10) Patent No.: US 12,664,923 B2
(45) Date of Patent: Jun. 23, 2026

(54) DATA PROCESSING APPARATUS, DATA PROCESSING METHOD, ELECTRONIC DEVICE, MEDIUM, AND SMART INTERACTIVE TABLET

(71) Applicant: BOE TECHNOLOGY GROUP CO., LTD., Beijing (CN)

(72) Inventors: Xitong Ma, Beijing (CN); Yangyang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 482 days.

(21) Appl. No.: 18/284,233

(22) PCT Filed: Dec. 21, 2021

(86) PCT No.: PCT/CN2021/139855
§ 371 (c)(1),
(2) Date: Sep. 26, 2023

(87) PCT Pub. No.: WO2023/115288
PCT Pub. Date: Jun. 29, 2023

(65) Prior Publication Data
US 2024/0169880 A1 May 23, 2024

(51) Int. Cl.
*G09G 3/20* (2006.01)

(52) U.S. Cl.
CPC ....... *G09G 3/2092* (2013.01); *G09G 2320/02* (2013.01); *G09G 2360/121* (2013.01)

(58) Field of Classification Search
None
See application file for complete search history.

(56) References Cited

U.S. PATENT DOCUMENTS 9,727,231 B2 * 8/2017 Miller .................. G06F 3/0488
10,417,515 B2 9/2019 Scott et al.
10,818,245 B2 * 10/2020 Krattiger ............. H05B 47/105
(Continued)

FOREIGN PATENT DOCUMENTS

CN 110211543 A 9/2019
CN 111459337 A 7/2020
(Continued)

*Primary Examiner* — Matthew Yeung
(74) *Attorney, Agent, or Firm* — HOUTTEMAN LAW LLC

(57) ABSTRACT

A data processing apparatus has an operation mode including a first mode; in the first mode: an image data receiving circuit in the data processing apparatus is configured to receive first image data sent by a main board; a touch information receiving circuit is configured to receive touch position information; a position analysis circuit is configured to acquire backlight division information corresponding to the touch position information, according to the touch position information, to obtain first backlight data; a backlight data selection circuit is configured to select and output the first backlight data to a backlight-source-to-be-driven; and an image data selection circuit is configured to output first compensated image data to a display-panel-for-displaying; where the first compensated image data are data obtained by compensating the first image data according to the first backlight data.

20 Claims, 5 Drawing Sheets

(56) References Cited

U.S. PATENT DOCUMENTS

| | | | | |
|---|---|---|---|---|
| 2013/0265239 | A1* | 10/2013 | Parekh | G06F 3/04883 345/173 |
| 2013/0342478 | A1* | 12/2013 | Bae | G06F 3/0443 345/173 |
| 2015/0130850 | A1 | 5/2015 | Wyatt | |
| 2015/0364073 | A1* | 12/2015 | Ogawa | G09G 5/10 345/690 |
| 2017/0371515 | A1* | 12/2017 | Feit | B60K 35/22 |
| 2020/0133068 | A1* | 4/2020 | Lu | G02B 6/0073 |
| 2021/0027722 | A1 | 1/2021 | Rao et al. | |
| 2023/0030106 | A1* | 2/2023 | Qi | G06F 3/04164 |
| 2025/0123713 | A1* | 4/2025 | Derichs | G06F 3/04883 |

FOREIGN PATENT DOCUMENTS

| | | | |
|---|---|---|---|
| CN | 113050839 | A | 6/2021 |
| WO | WO2019239928 | A1 | 12/2019 |

* cited by examiner

DATA PROCESSING APPARATUS, DATA PROCESSING METHOD, ELECTRONIC DEVICE, MEDIUM, AND SMART INTERACTIVE TABLET

TECHNICAL FIELD

The present disclosure relates to the field of display technology, and in particular to a data processing apparatus, a data processing method, an electronic device, a computer readable medium and a smart interactive tablet.

BACKGROUND

With continuous development of internet information technology, a demand for remote office is increasing, and a demand for an electronic whiteboard is also increasing greatly. The electronic whiteboard is a new high-tech product which is researched and developed by combining a plurality of high-tech means such as advanced electronic technology, software technology, and the like. The electronic whiteboard can realize a plurality of functions such as paperless office, teaching, and the like, by applying the principle of electromagnetic induction and combining with a computer and a projector.

SUMMARY

The present disclosure aims to solve at least one technical problem in the prior art, and provides a data processing apparatus, a data processing method, an electronic device, a computer readable medium, and a smart interactive tablet.

In a first aspect, an embodiment of the present disclosure provides a data processing apparatus, where an operation mode of the data processing apparatus includes a first mode; the data processing apparatus includes an image data receiving circuit, a touch information receiving circuit, a position analysis circuit, a backlight data selection circuit and an image data selection circuit; where in the first mode:

the image data receiving circuit is configured to receive first image data sent by a main board;

the touch information receiving circuit is configured to receive touch position information;

the position analysis circuit is configured to acquire backlight division information corresponding to the touch position information, according to the touch position information, to obtain first backlight data;

the backlight data selection circuit is configured to select and output the first backlight data to a backlight-source-to-be-driven; and the image data selection circuit is configured to output first compensated image data to a display-panel-for-displaying; where the first compensated image data are data obtained by compensating the first image data according to the first backlight data.

The data processing apparatus further includes a first compensation circuit; where in the first mode:

the first compensation circuit is configured to compensate the first image data delayed by a first predetermined time with respect to the received touch position information, according to the first backlight data, to obtain the first compensated image data.

The first predetermined time is a first predetermined number of frame periods.

The touch information receiving circuit is configured to receive the touch position information sent by the main board.

The touch information receiving circuit is configured to receive the touch position information sent by a touch component.

The position analysis circuit includes:

a first delay sub-circuit configured to delay the touch position information received by the touch information receiving circuit by a second predetermined time, and then send the touch position information;

a first position information storage sub-circuit configured to receive and store the touch position information sent by the first time delay sub-circuit; and a first division information acquiring sub-circuit configured to determine the backlight division information corresponding to the touch position information according to the touch information stored by the first position information storage sub-circuit, to obtain the first backlight data, such that the backlight data selection circuit outputs the first backlight data to the backlight-source-to-be-driven.

The second predetermined time is a predetermined number of frame periods; and the first delay sub-circuit is configured to delay the touch position information received by the touch information receiving circuit by the predetermined number of frame periods, and then send the touch position information.

The first delay sub-circuit includes a FIFO memory.

The position analysis circuit includes:

a second position information storage sub-circuit configured to store the touch position information received by the touch information receiving circuit;

a second division information acquiring sub-circuit is configured to determine the backlight division information corresponding to the touch position information according to the touch position information stored by the position information storage sub-circuit, to obtain the first backlight data; and a second delay sub-circuit is configured to delay the first backlight data by a third predetermined time, and then send the first backlight data to the backlight data selection circuit.

The third predetermined time is a predetermined number of frame periods; and the second delay sub-circuit is configured to delay the first backlight data by the predetermined number of frame periods and then send the first backlight data to the backlight data selection circuit.

The second delay sub-circuit includes a FIFO memory.

The position analysis circuit is configured to update the first backlight data corresponding to the first image data of a previous frame, according to the touch position information, and acquire the backlight division information corresponding to the touch position information, to obtain the first backlight data corresponding to the touch position information.

The operation mode of the data processing apparatus further include a second mode, and the data processing apparatus further includes an image data cache circuit;

in the second mode: the image data receiving circuit is further configured to receive second image data sent by the main board;

the image data cache circuit is configured to cache the second image data; and the image data selection circuit is further configured to output second compensated image data to the display-panel-for-displaying; where the second compensated image data are obtained by compensating the second image data according to second backlight data; and the second backlight data are calculated according to the second image data received by the image data receiving circuit.

The data processing apparatus further includes a second compensation circuit; where in the second mode:

the second compensation circuit is configured to compensate the second image data read out by the image data cache circuit, according to the second backlight data, to obtain the second compensated image data.

The image data cache circuit includes:

a writing control sub-circuit configured to receive the second image data and write the second image data into a memory; and a reading control sub-circuit configured to read the second image data in the memory, such that the image data selection circuit outputs the second compensated image data.

The data processing apparatus further includes a backlight data calculation circuit, where the backlight data calculation circuit is configured to calculate the second backlight data, according to the second image data received by the image data receiving circuit, and send the second backlight data to the backlight data selection circuit, such that the backlight data selection circuit outputs the second backlight data to the backlight-source-to-be-driven.

The backlight data calculation circuit includes:

a backlight characteristic value calculation sub-circuit configured to, in the second mode, acquire gray-scale value of respective pixels according to the second image data received by the image data receiving circuit, and obtain a backlight characteristic value of each backlight division corresponding to a pixel region, according to the gray-scale values of the pixels in the pixel region; and a backlight driving voltage calculation sub-circuit is configured to calculate a backlight driving voltage value of a light source in each backlight division according to the backlight characteristic value, to obtain the second backlight data, and output the second backlight data to the backlight data selection circuit for output.

The data processing apparatus further includes:

a mode analysis circuit configured to receive and analyze mode information sent by the main board, to obtain the operation mode of the display apparatus.

In a second aspect, an embodiment of the present disclosure provides a data processing method, including: in a first mode, sending first image data to a display-panel-for-displaying, and simultaneously sending first backlight data to a backlight-source-to-be-driven; where in the first mode, the sending the first image data to the display-panel-for-displaying, includes:

receiving the first image data sent by a main board; and compensating the first image data according to the first backlight data, to obtain first compensated image data, and sending the first compensated image data to the display-panel-for-displaying; and in the first mode, the sending the first backlight data to the backlight-source-to-be-driven, includes:

receiving touch position information; and acquiring backlight division information corresponding to the touch position information, according to the touch position information, to obtain the first backlight data, and sending the first backlight data to the backlight-source-to-be-driven.

The compensating the first image data according to the first backlight data, to obtain the first compensated image data, and sending the first compensated image data to the display-panel-for-displaying, includes:

compensating the first image data delayed by a first predetermined time with respect to the received touch position information, according to the first backlight data, to obtain the first compensated image data; and sending the first compensated image data to the display-panel-for-displaying.

The first predetermined time is a first predetermined number of frame periods; the compensating the first image data delayed by the first predetermined time with respect to the received touch position information, according to the first backlight data, to obtain the first compensated image data, includes:

compensating the first image data delayed by the first predetermined number of frame periods with respect to the received touch position information, according to the first backlight data, to obtain the first compensated image data.

The receiving the touch position information, includes:

receiving the touch position information sent by the main board.

The receiving the touch position information, includes:

receiving the touch position information sent by a touch component.

The acquiring the backlight division information corresponding to the touch position information, according to the touch position information, to obtain the first backlight data, and sending the first backlight data to the backlight-source-to-be-driven, includes:

delaying the touch position information by a second predetermined time, and then storing the touch position information; and determining backlight division information corresponding to the touch position information stored after the touch position information being delayed by the second predetermined time, according to the touch position information, to obtain the first backlight data, and sending the first backlight data to the backlight-source-to-be-driven.

The second predetermined time is a second predetermined number of frame periods; and the delaying the touch position information by the second predetermined time, and then storing the touch position information, includes:

delaying the touch position information by the second predetermined number of frame periods, and then storing the touch position information.

The acquiring the backlight division information corresponding to the touch position information, according to the touch position information, to obtain the first backlight data, and sending the first backlight data to the backlight-source-to-be-driven, includes:

storing the touch position information;

determining the backlight division information corresponding to the touch position information according to the stored touch position information, to obtain the first backlight data; and delaying the first backlight data by a third predetermined time, and then sending the first backlight data to the backlight-source-to-be-driven.

The third predetermined time is a third predetermined number of frame periods; and delaying the first backlight data by the third predetermined time, and then sending the first backlight data to the backlight-source-to-be-driven, includes:

delaying the first backlight data by the third predetermined number of frame periods, and then sending the first backlight data to the backlight-source-to-be-driven.

The acquiring the backlight division information corresponding to the touch position information, according to the touch position information, to obtain the first backlight data, and sending the first backlight data to the backlight-source-to-be-driven, includes:

updating the first backlight data corresponding to the first image data of a previous frame, according to the touch position information, and acquiring the backlight division information corresponding to the touch position information, to obtain the first backlight data corresponding to the touch position information, and sending the first backlight data to the backlight-source-to-be-driven.

The data processing method further includes:

in a second mode, sending second image data to the display-panel-for-displaying, and simultaneously sending second backlight data to the backlight-source-to-be-driven; where in the second mode, the sending the second image data to the display-panel-for-displaying, includes:

receiving the second image data sent by the main board;

caching the second image data; and reading the cached second image data, compensating the second image data according to the second backlight data corresponding to the second image data, to obtain second compensated image data, and sending the second compensated image data to the display-panel-for-displaying; and in the second mode, the sending the second backlight data to the backlight-source-to-be-driven, includes:

calculating the second backlight data according to the second image data, and sending the second backlight data to the backlight-source-to-be-driven.

The calculating the second backlight data according to the second image data, and sending the second backlight data to the backlight-source-to-be-driven, includes:

acquiring gray-scale values of respective pixels according to the second image data, and obtaining a backlight characteristic value of each backlight division corresponding to a pixel region, according to the gray-scale values of the pixels in the pixel region; and calculating a backlight driving voltage value of a light source in each backlight division according to the backlight characteristic value, to obtain the second backlight data, and sending the second backlight data to the backlight-source-to-be-driven.

The data processing method further includes:

receiving and analyzing mode information sent by the main board, to obtain an operation mode of the display apparatus; where the operation mode includes the first mode and a second mode.

In a third aspect, an embodiment of the present disclosure provides an electronic device, including:

one or more processors; and a memory for storing one or more programs which, when being executed by the one or more processors, cause the one or more processors to implement any one of the target tracking methods described above.

The processor includes a field programmable gate array.

In a fourth aspect, an embodiment of the present disclosure provides a computer readable medium storing instructions which, when executed by a processor, implement the steps of any one of the data processing methods described above.

In a fifth aspect, an embodiment of the present disclosure provides a smart interactive tablet, including:

a main board, a data processing apparatus, a display panel, a touch component and a backlight source, where the image data processing apparatus employs any one of the image data processing apparatuses described above.

The touch component is configured to send the touch position information to the data processing apparatus.

The touch component is configured to send the touch position information to the main board, and the main board is configured to send the touch position information to the data processing apparatus.

The touch component is a capacitance touch component or an infrared touch component.

The main board is configured to send image data to the data processing apparatus; and the image data includes the first image data and second image data.

The main board is configured to send mode information to the data processing apparatus, such that the data processing apparatus analyzes the operation mode, where the operation mode includes the first mode and a second mode.

DETAIL DESCRIPTION OF EMBODIMENTS

Figure 1:
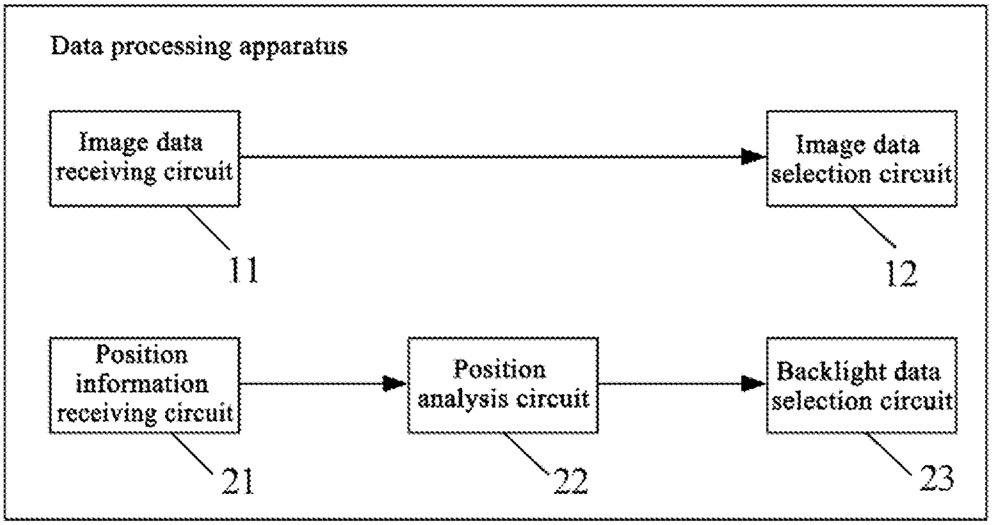
FIG. 1 is a schematic diagram illustrating a structure of a data processing apparatus according to an embodiment of the present disclosure.

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which the present disclosure belongs. The use of "first", "second", and the like in the present disclosure is not intended to indicate any order, quantity, or importance, but rather serves to distinguish one element from another. Also, the term "a", "an", "the", or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled", or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

A smart interactive tablet (also called an electronic whiteboard, or a smart whiteboard) is a touch interactive display device with a large size (generally more than 50 inches), which is applied in the fields of conferences and education. The smart interactive tablet can support a user to write on a display screen through a touch component, and display the handwriting of the user in real time. As one of the display apparatuses, the smart interactive tablet further includes a display panel (typically a liquid crystal display panel) and a backlight source. At present, in order to improve the quality and the contrast of the displayed image of the display apparatus and reduce power consumption, a backlight source capable of local dimming is employed as the backlight source. That is, a lamp board of the backlight source is divided into a plurality of lamp regions, where each of the plurality of lamp regions provides light for one or more of pixels arranged in an array in the display panel. Therefore, a brightness of a respective lamp region of the backlight source can be adjusted (i.e., a local dimming can be performed) according to the image displayed on the display panel, to achieve the effects of improving the quality and the contrast of the displayed image and reducing the power consumption. For a local dimming display apparatus, a Field-Programmable Gate Array (FPGA) is generally used to perform backlight statistics and pixel compensation of a display image. For example, it may specifically include methods such as backlight characteristic value calculation, backlight value smoothing, pixel backlight value calculation through backlight diffusion, pixel compensation of a display image, and the like. For a traditional electronic whiteboard conference system, no matter in a writing mode or a non-writing mode (i.e. a viewing mode), when local dimming is performed on a backlight source, image data of the whole image is required to be counted, so that frame cache of the image data is necessary to ensure synchronization between frames of the image and the backlight, and therefore, in a process of using an electronic whiteboard based on a System On Chip (SOC) and an FPGA, frame delay of the image data at an FPGA end is inevitably caused, and a display effect and a user experience effect are influenced. A handwriting delay is an important parameter index for products such as an electronic whiteboard, and the current scheme of using the FPGA to perform local dimming improves the display effect but increases the time of handwriting delay.

In view of the foregoing problems, an embodiment of the present disclosure provides a data processing apparatus, which may be a processor, and specifically may be an FPGA. Operation modes of the data processing apparatus according to the embodiment of the present disclosure include at least a first mode and a second mode. In the embodiment of the present disclosure, the first mode is a writing mode, and the second mode is a non-writing mode (including but not limited to a viewing mode).

FIG. 1 is a schematic diagram illustrating a structure of a data processing apparatus according to an embodiment of the present disclosure. As shown in FIG. 1, the operation mode of the data processing apparatus includes a writing mode. The data processing apparatus may include an image data receiving circuit 11, a touch information receiving circuit 21, a position analysis circuit 22, a backlight data selection circuit 23, and an image data selection circuit 12.

Referring to FIG. 1, in the writing mode, the image data receiving circuit 11 is configured to receive first image data sent by a main board. The image data receiving circuit 11 is generally denoted by RX. The main board may be an SOC, which is also called a system on chip, and is configured to generate image data, for example, in a writing mode, generate first image data according to touch position information, and send the first image data to the image data receiving circuit 11. Of course, the main board is also used for processing video image signals of various formats, converting the various formats into a signal format agreed with the data processing apparatus, or converting the various formats into a signal format corresponding to the image data receiving circuit 11. In some examples, the image data receiving circuit 11 communicates with the main board according to a VBO (V-By-One, i.e., video by one) protocol. Accordingly, the main board may be a product formed by combining integrated circuits with specific functions in one chip, and may perform data processing on image data to generate a VBO format signal, and send the VBO format signal to the image data receiving circuit 11. The VBO is a digital interface standard technology facing image information transmission, can support 4.0 Gbps high-speed signal transmission, and is widely applied to the field of ultra-high-definition liquid crystal display.

In the writing mode, the touch information receiving circuit 21 is configured to receive touch position information. Specifically, when the touch component of the display panel is touched, the touch information is sent to the touch information receiving circuit 21. The touch position information is coordinates of a touched point. In this case, the touch component may directly send the touch position information to the touch information receiving circuit 21. Alternatively, the touch component may send the touch position information to the touch information receiving circuit 21 through the main board. The execution body sending the touch position information is not limited in the embodiment of the present disclosure. In some examples, the touch information receiving circuit 21 may be a Universal Asynchronous Receiver/Transmitter (UART) or a Serial Peripheral Interface (SPI). The specific structure of the touch information receiving circuit 21 is not limited in the embodiment of the present disclosure, as long as the receiving of the touch position information sent by the main board or the touch component can be completed.

In the writing mode, the position analysis circuit 22 is configured to acquire backlight division information corresponding to touch position information, according to the touch position information. Specifically, the position analysis circuit 22 may obtain a pixel region corresponding to the touch position information, according to the touch position information received by the touch information receiving circuit 21, and then acquire backlight division information corresponding to the touch position information, through a method including but not limited to table lookup (mapping), and generate first backlight data.

In the writing mode, the backlight data selection circuit 23 is configured to select and output the first backlight data to a backlight-source-to-be-driven. It should be noted that the backlight data selection circuit 23 in the embodiment of the present disclosure may be of a hardware structure. For example, since the display apparatus is in the writing mode, each light source in a backlight division corresponding to a position where no touch is generated may be turned off or emit a light with a specific brightness. Each light source in a backlight division corresponding to the touch position may emit a light with a specific brightness. In some examples, for a color displayed by the pixel at the touch position, the backlight data selection circuit 23 may select and output a backlight driving voltage corresponding to the color to each light source in the corresponding backlight division. That is, the backlight driving voltages corresponding to the displays of different colors may be different, so that a better display image quality can be achieved under the writing of different colors. In some examples, in the writing mode, each light source in the backlight division corresponding to the pixel region where no touch is generated is kept in an off state, so that the effect of reducing power consumption can be achieved.

In the writing mode, the image data selection circuit 12 is configured to output a first compensated image data to a display-panel-for-displaying. The first compensated image data are data obtained by compensating the first image data received by the image data receiving circuit 11 according to the first backlight data sent by the backlight data selection circuit 23. It should be noted that the image data selection circuit 12 in the embodiment of the present disclosure may be of a hardware structure.

In some examples, since the image data selection circuit outputs the first compensated image data, a first compensation circuit 13 may be arranged between the image data reception circuit 11 and the image data selection circuit 12. The first compensation circuit 13 is configured to, in the writing mode, acquire parameter information corresponding to the first image data according to the received first image data sent by the image data receiving circuit 11, and compensate the first image data according to the parameter information corresponding to the image data and the first backlight data, to obtain the first compensated image data, where the parameter information includes but is not limited to at least one of brightness, gray-scale value, and color of each pixel. The first image data are compensated according to the first backlight data, and the first image data after compensation serves as an input of each pixel in the display panel, so that the display image quality of the display panel can be effectively improved. Furthermore, in the embodiment of the present disclosure, the first backlight data are directly acquired according to the touch position information, and is not required to be obtained after waiting for one or more frames of first image data, so that the problem of display delay is effectively relieved.

In some examples, the first compensation circuit 13 is configured to compensate the first image data delayed by a first predetermined time with respect to the touch position information received by the position analysis circuit 22, according to the first backlight data, to obtain the first image data after compensation, that is, the first compensated image data. Furthermore, since the data processing apparatus keeps synchronization between frames of the image and the backlight when processing the image data and the backlight data, the first predetermined time is preferably a first predetermined number of frame periods. That is, the first compensation circuit 13 compensates the first image data delayed by a certain number of frame periods with respect to the touch position information received by the position analysis circuit 22, according to the first backlight data. It should be noted that, for a product, the frame period is a fixed value. In some examples, the position analysis circuit 22 is specifically configured to obtain a handwriting parameter according to the received touch position information, to acquire handwriting position information according to a predetermined algorithm, and to obtain the backlight division information according to the handwriting position information, that is, to obtain the first backlight data. The handwriting parameter includes at least one of color, line width, and the like; and the predetermined algorithm may be a handwriting smoothing algorithm, such as a Bezier curve or the like.

For example, one touch point (touch position information) corresponds to 10×10 pixels, that is, a line width of a handwriting is 10 pixels. In a case where one touch point corresponds to one backlight division, and since the handwriting corresponding to the touch point corresponds to 10 pixels, the 10 pixels just right correspond to two backlight divisions, the first backlight data are required to be determined according to the backlight division information obtained by the handwriting information. Namely, a process of obtaining the first backlight data by the position analysis circuit includes the following steps: touch position information→handwriting information→backlight divisions→first backlight data.

In some examples, the position analysis circuit 22 obtains the first backlight data according to the received touch position information, and specifically may update the first backlight data corresponding to first image data of a previous frame according to the received touch position information, to acquire the first backlight data corresponding to current touch position information. That is to say, when the touch position information changes, only the first backlight data are updated, and the backlight data corresponding to each backlight division are not recalculated, so that the calculation amount can be greatly reduced, and the display delay can be reduced as much as possible.

In summary, with the data processing apparatus according to an embodiment of the present disclosure, in the writing mode, the first backlight data may be calculated according to the touch position information, and the first backlight data may be obtained by calculation without waiting for the frame image data to be acquired, so that the first image data sent by the main board and received by the image data receiving circuit 11 is compensated, and is not required to be cached, and the image data selection circuit 12 may directly output the first image data after compensation, thereby ensuring synchronous output of the backlight data and the image data, and thus effectively reducing display delay of the display apparatus and improving display quality.

Figure 2:
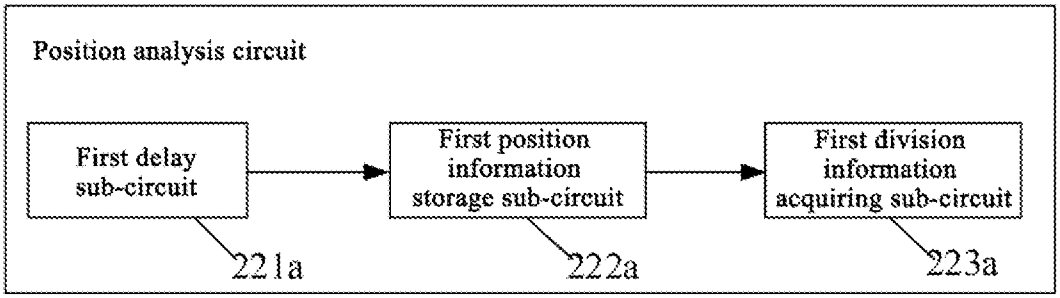
FIG. 2 is a schematic diagram illustrating a structure of a position analysis circuit in a data processing apparatus according to an embodiment of the present disclosure.
Figure 3:
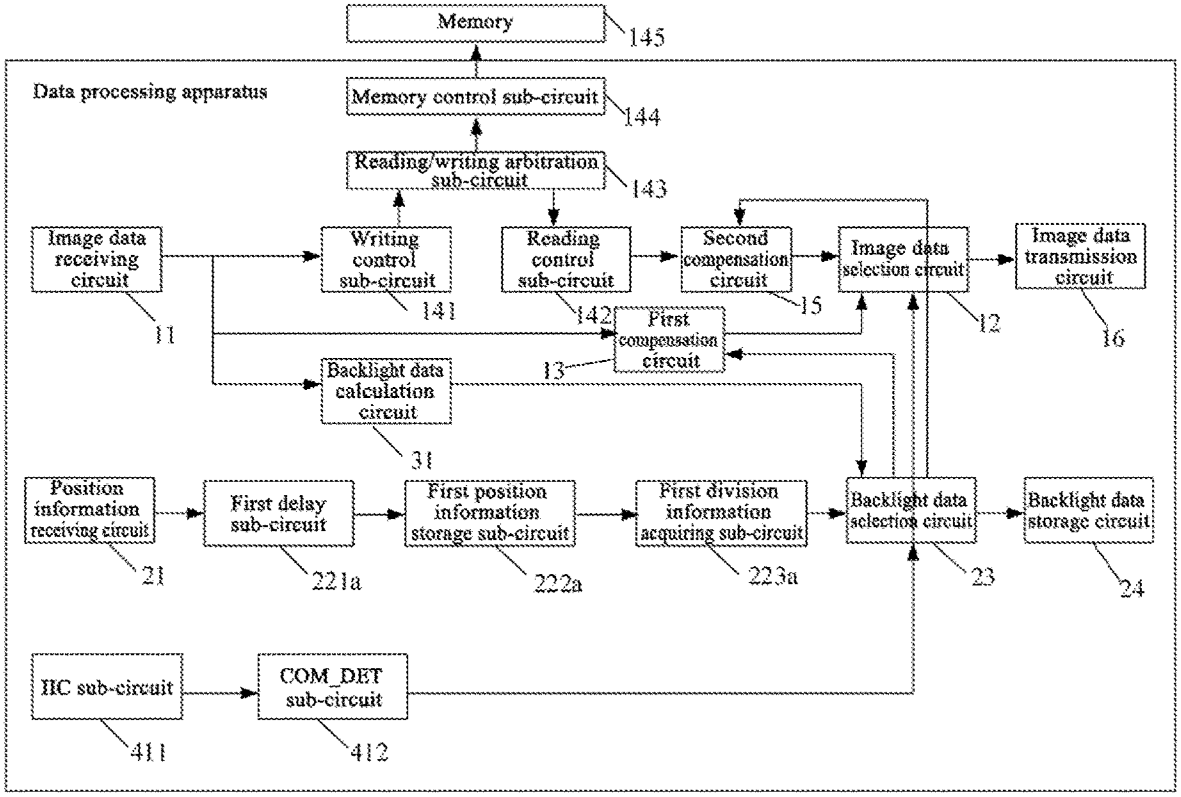
FIG. 3 is a schematic diagram illustrating a structure of another data processing apparatus according to an embodiment of the present disclosure.

In some examples, FIG. 2 is a schematic diagram illustrating a structure of a position analysis circuit in a data processing apparatus according to an embodiment of the present disclosure; and FIG. 3 is a schematic diagram illustrating a structure of another data processing apparatus according to an embodiment of the present disclosure. As shown in FIGS. 2 and 3, the position analysis circuit 22 in the embodiment of the present disclosure may include a first delay sub-circuit 221*a*, a first position information storage sub-circuit 222*a*, and a first division information acquiring sub-circuit 223*a*. It should be noted that, the position analysis circuit 22 may be a processor, where the functions of the first delay sub-circuit 221*a*, the first position information storage sub-circuit 222*a*, and the first division information acquiring sub-circuit 223*a* are implemented by a program stored in the processor.

The first delay sub-circuit 221*a* is configured to, in the writing mode, delay the touch position information received by the touch information receiving circuit 21 by a second predetermined time, and then send the touch position information to the position information storage sub-circuit 222. It should be understood that, since the delay sub-circuit 221 delays and sends the touch position information, the first backlight data output by the backlight data selection circuit 23 will also be delayed by a certain time. The reason why the sending of the backlight data is required to be delayed is that a certain time is needed when the first image data are generated at the main board end, so that the first image data received by the image data receiving circuit 11 is delayed, and the touch position information is delayed when being sent to the main board end, so that the sending of the first backlight data is delayed to be consistent with the sending of the first image data as far as possible. Therefore, the second predetermined time for delaying the sending of the touch position information is related to the time for generating the first image data by the main board according to the touch information; or the second predetermined time is related to the time for generating the first image data by the main board according to the touch information and the delay time for receiving the touch information by the main board. For a product, the time delay for touch is of a certain value.

Specifically, since the image processing apparatus generally processes the backlight data and the image data in accordance with synchronization between frames of the image and the backlight, the delay time may be calculated in units of frame periods. In addition, the first backlight data are obtained according to the whole frame of image data, that is, in the writing mode, the first backlight data are required to be obtained according to the whole frame of touch position information, so that the first backlight data are required to be delayed by a second predetermined number of frame periods and then sent synchronously with the first image data. It can be understood that the second predetermined time is a second predetermined number of frame periods, which may be acquired by dividing the time for generating the first image data by the main board according to the touch information, by the frame period. The frame period for the first image data is fixed, so that the second predetermined time may be obtained by simply obtaining the time for generating the first image data by the main board according to the touch information. The delay time for generating the first image data at the main board end may be obtained through testing. The following describes a method of testing the delay time for generating the first image data by the main board.

The whole link from the touch action to the image display is as follows: the touch action on the touch screen→the main board→the data processing apparatus→the display panel. A total delay time from the occurrence of the touch action to the display of the image includes: a touch delay t1; a transmission delay t2 for generating the first image data at the main board end; a data processing apparatus delay t3; a display delay t4 for the display panel; i.e., a total delay T=t1+t2+t3+t4. The touch delay t1 and the display delay t4 for the display panel are constant. In the embodiment of the present disclosure, the data processing apparatus delay t3 is required to be zero. The following describes a test of the transmission delay of the image data at the main board end. The test method for calculating the delay of the image data at the main board end includes mobile phone video recording method and oscilloscope measurement method.

A First Method: Mobile Phone Video Recording Method

Using a high-speed camera to record the touch operation, and analyzing the video, where a frame rate of the high-speed camera is F; recording a frame number F0 of a finger passing through a reference line by analyzing a video frame by frame; recording a frame number F1 of an image passing through the reference line; calculating the number of frames of the delay between touch and image data, ΔF=F1−F2; calculating time, T=ΔF×(1/F)=(F1−F2)/F; combining with T=t1+t2+t3+t4; and calculating the delay for generating the first image data at the main board end, t2=T−t1−t3−t4=(F1−F2)/F−t1−t3−t4.

A Second Method: Oscilloscope Measurement Method

A direct measurement is carried out, through an oscilloscope, on serial port data received by the main board end and image mark information received by the data processing apparatus end. Specific operation steps are as follows: keeping the touch screen black in full-screen; connecting an oscilloscope probe 1 to a serial port, and connecting an oscilloscope probe to a pin of the data processing apparatus. Touching the screen separately, the serial port bus has data to appear, and the data processing apparatus outputs a signal after detecting an image. Through the oscilloscope, reading a time difference between the two signals, which is the delay for generating the first image data at the main board end.

In some examples, the first delay sub-circuit includes a FIFO memory. The specific implementation is as follows: initializing when powered on; in the writing mode, writing the touch position information received by the touch information receiving circuit 21 into the FIFO, and outputting the touch position information after a delay ΔT.

The first position information storage sub-circuit 222*a* is configured to receive and store the touch position information sent by the first delay sub-circuit. For example, the display panel in the embodiment of the present disclosure is a capacitive screen with a resolution of 224×126, and in this case, the position information storage sub-circuit 222 stores the position information of a touch on the capacitive screen, for example, coordinates information of the position where the touch occurs.

In some examples, the first position information storage sub-circuit 222*a* may be a Random Access Memory (RAM), and may specifically employ a 16-bit depth (upper 8 bits represent row information, and lower 8 bits represent column information), and 1-bit data.

The first division information acquiring sub-circuit 223*a* is configured to determine, according to the touch information stored by the first position information storage sub-circuit 222, backlight division information corresponding to the touch position information, to obtain the first backlight data, and send, through the backlight data selection circuit 23, the first backlight data to the backlight-source-to-be-driven.

Specifically, the first division information acquiring sub-circuit 223*a* may map the resolution information of the capacitive screen to the backlight division module. For example, the backlight division information is 96×56, and the specific mapping relationship is as follows: (position information on the capacitive screen is (a, b); and position information in the backlight is (x, y)) x=a×96/224; y=b×56/

112. Therefore, the backlight division information of the pixels corresponding to the touch position information may be acquired.

Figure 4:
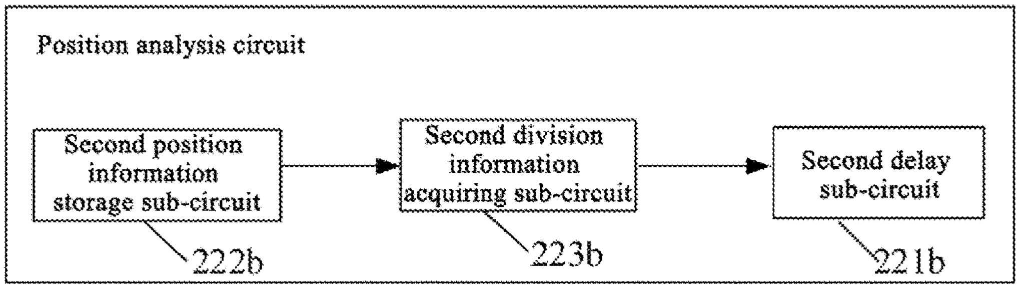
FIG. 4 is a schematic diagram illustrating a structure of a position analysis circuit in a data processing apparatus according to an embodiment of the present disclosure.
Figure 5:
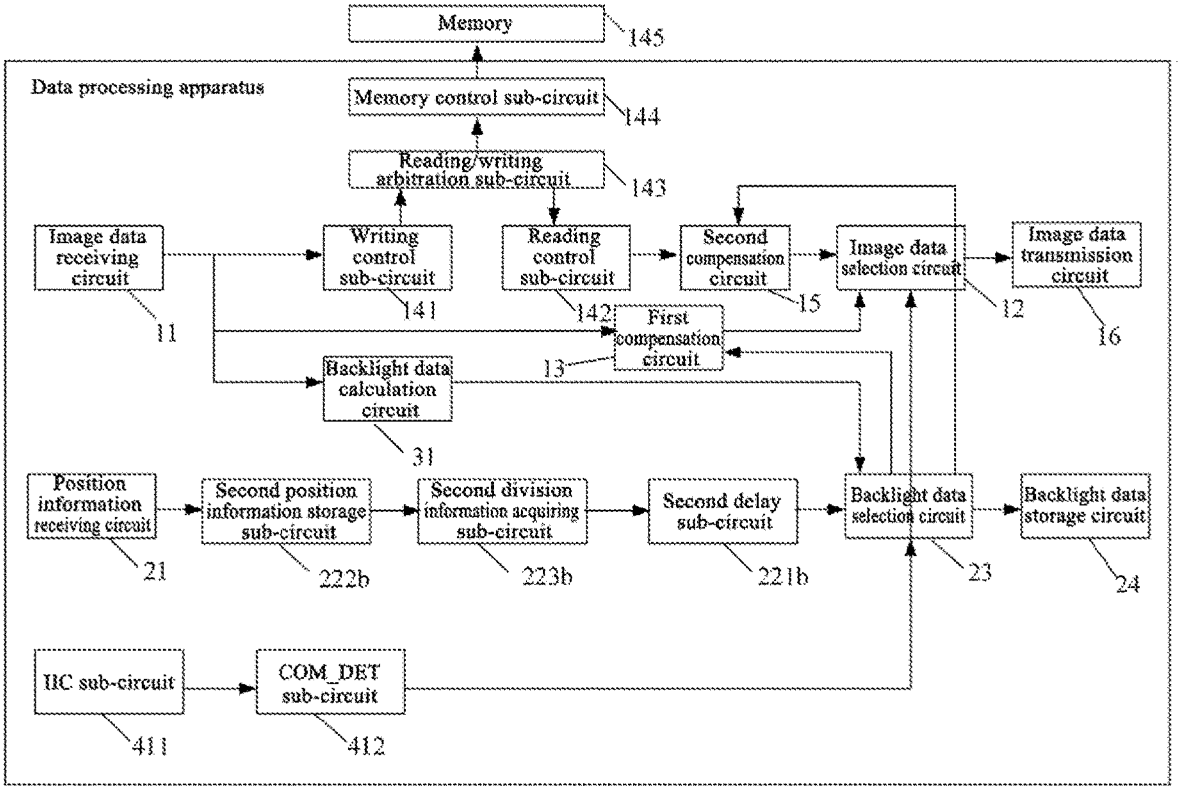
FIG. 5 is a schematic diagram illustrating a structure of another data processing apparatus according to an embodiment of the present disclosure.

In some examples, FIG. 4 is a schematic diagram illustrating a structure of a position analysis circuit in a data processing apparatus according to an embodiment of the present disclosure; and FIG. 4 is a schematic diagram illustrating a structure of another data processing apparatus according to an embodiment of the present disclosure. As shown in FIGS. 4 and 5, the position analysis circuit 22 in the embodiment of the present disclosure may include a second delay sub-circuit 221*b*, a second position information storage sub-circuit 222*b*, and a second division information acquiring sub-circuit 223*b*. However, a difference exists that, in this example, the second position information storage sub-circuit 222*b* is configured to store the touch position information received by the touch information receiving circuit 21; the second division information acquiring sub-circuit 223*b* is configured to determine, according to the touch information stored by the first position information storage sub-circuit 222*a*, the backlight division information corresponding to the touch position information, and obtain the first backlight data; and the second delay sub-circuit 221*b* is configured to delay the first backlight data by a third predetermined time and then send the delayed first backlight data to the backlight data selection circuit 23, so that the backlight data selection circuit 23 sends the first backlight data to the backlight-source-to-be-driven. That is, in this example, the first backlight data are required to be delayed by the third predetermined time after being generated and then sent to the backlight data selection circuit 23, to ensure that the first backlight data and the first image data are output synchronously, to reduce the display delay. It should be noted that the position analysis circuit 22 may be a processor, and the functions of the second delay sub-circuit 221*b*, the second position information storage sub-circuit 222*b*, and the second division information acquiring sub-circuit 223*b* are implemented by a program stored in the processor.

Furthermore, during the third predetermined time, for which the first backlight data are delayed after being generated and then are sent to the backlight data selection circuit 23, the main board may generate predetermined frames of the first image data. That is, the third predetermined time may also be a third predetermined number of frame periods. The reason why the delay for the predetermined frames of the first image data is required is that the image processing apparatus generally processes the backlight data and the image data in accordance with synchronization between frames of the image and the backlight, so that the frame period can be taken as a unit when calculating the delay time, and therefore the first backlight data are output after being delayed by the predetermined frames of the first image data, and the first backlight data and the first image data can be ensured to be output synchronously.

In some examples, the second delay sub-circuit 221*b* includes a FIFO memory. The specific implementation is as follows: initializing when powered on; in the writing mode, writing the touch position information received by the touch information receiving circuit 21 into the FIFO, and outputting the touch position information after a delay ΔT.

In some examples, the operation mode of the data processing apparatus in the embodiments of the present disclosure includes not only the writing mode but also a non-writing mode. The non-writing mode is a normal display mode of the display apparatus, such as a viewing mode. As shown in FIG. 3, the data processing apparatus according to the embodiment of the present disclosure may include not only the above-described structure but also an image data cache circuit. In the non-writing mode, the image data receiving circuit 11 is configured to receive second image data; and the image data cache circuit is configured to cache the second image data. Accordingly, the image data selection circuit 12 is further configured to, in the non-writing mode, output second compensated image data to the display-panel-for-displaying; where the second compensated image data are data obtained by, in the non-writing mode, compensating the second image data output by the image data cache circuit according to the second backlight data. It should be noted that, since the image data selection circuit outputs data obtained by, in the non-writing mode, compensating the image data output by the image data cache circuit according to the second backlight data, in the data processing apparatus according to an embodiment of the present disclosure, a second compensation circuit 15 is arranged between the image data cache circuit and the image data selection circuit 12, and the second compensation circuit 15 obtains, in the non-writing mode, the second compensated image data according to the received second image data output by the image data cache circuit and the second backlight data. The second backlight data are backlight data obtained according to parameter information corresponding to the obtained second image data, where the parameter information includes but is not limited to at least one of brightness, gray-scale value, and color of each pixel, and preferably the gray-scale value. The second image data are compensated according to the second backlight data, and the compensated image data serves as an input of each pixel in the display panel, so that the display quality of the display panel can be effectively improved.

Furthermore, with continued reference to FIG. 3, the image data cache circuit in the embodiment of the present disclosure may specifically include a writing control sub-circuit 141 and a reading control sub-circuit 142. The writing control sub-circuit 141 is configured to receive the second image data output by the image data receiving circuit 11, and write the second image data to the memory 145. The reading control sub-circuit 142 is configured to read the second image data in the memory 145, to allow the image data selection circuit 12 to output the second compensated image data. The memory 145 may be a DDR (Double data Rate, Double data synchronous dynamic random access memory). For example, the memory is DDR3, serves for reading and writing video signals, may be made of semiconductor devices, may transmit data twice in one clock cycle, and is characterized by a high speed of reading data. Alternatively, in some examples, the image data cache circuit further includes a reading/writing arbitration sub-circuit 143 and a memory control sub-circuit 144. The reading/writing arbitration sub-circuit 143 serves to coordinate the reading/writing operations. For example, when a reading request or a writing request of the DDR3 comes at the same time, the reading/writing arbitration sub-circuit 143 determines which request is executed first, and coordinates the writing control request and the read control request, so that data reading/writing confusion is prevented. The memory control sub-circuit 144 serves to maintain memory and manage memory addresses, or the like. It should be noted that, since the memory 145 has a fast storage rate, in the non-writing mode, the image data receiving circuit 11 may store the second image data of the pixels into the memory every time the second image data of the pixels in a plurality of rows are received.

In some examples, as shown in FIG. 3, the data processing apparatus according to the embodiment of the present disclosure may include not only the above-described structure but also a backlight data calculation circuit 31. The backlight data calculation circuit 31 is configured to, in the non-writing mode, calculate the second backlight data according to the second image data received by the image data reception circuit 11, and send the second backlight data to the backlight data selection circuit 23, so that the backlight data selection circuit 23 sends the second backlight data to the backlight-source-to-be-driven.

For example, in the non-writing mode, the backlight data calculation circuit 31 may obtain backlight characteristic values corresponding to the backlight divisions according to the parameter information of the pixels obtained from the second image data, for example, the gray-scale values of the pixels, and then calculate the backlight driving voltage values of respective divisions according to the backlight characteristic values of the respective divisions, that is, obtain the second backlight data. It should be noted that one pixel region may include a plurality of pixels arranged in an array, one backlight division corresponds to one pixel region, and a correspondence between the backlight divisions and the pixel regions may be stored in a storage module of the backlight calculation circuit in a form of a mapping table.

Specifically, the backlight data calculation circuit 31 may include a backlight characteristic value calculation sub-circuit and a backlight driving voltage calculation sub-circuit. The backlight characteristic value calculation sub-circuit may obtain the backlight characteristic value through weighting an average value and a maximum value of the gray-scale values of the pixels in the pixel region corresponding to each backlight division, and weights of the average value and the maximum value of the gray-scale values may be set according to the display scene. For example, pixel gray-scale value is gx=MAX(R,G,B), the number of pixels in each pixel region is 40×40=1600, and the average value of the gray-scale values of the pixels in the pixel region is counted as follows: M0=SUM(G0+G1+ . . . +G1599); the maximum value of the gray-scale values of the pixels in the pixel region is counted as follows: M1=MAX (G0:G1599); and the backlight characteristic value Fcal is calculated as follows: Fcal=M0×(1−P0)+M1×P0. P0 is a weighting factor, and in the embodiment of the present disclosure, P0=0.75 is taken as an example. The backlight driving voltage calculation sub-circuit may calculate a backlight driving voltage value for each backlight division, according to the obtained backlight characteristic value, and output the backlight driving voltage value to the backlight data selection circuit 23 for output.

In the data processing apparatus according to the embodiment of the present disclosure, since the backlight data calculation circuit 31 is provided, it is possible to individually control the backlight division corresponding to each pixel region in the display apparatus, and thus it is possible to effectively improve the quality and the contrast of the displayed image, and to reduce the power consumption.

In some examples, as shown in FIG. 3, the data processing apparatus in the embodiment of the present disclosure includes not only the above structure, but also a mode analysis circuit. The mode analysis circuit is configured to receive mode information sent by the main board, and analyze the mode information to obtain an operation mode of the display apparatus. The operation mode includes a writing mode and a non-writing mode.

For example, the mode analysis circuit includes an IIC (Inter-Integrated Circuit) sub-circuit 411 and a COM_DET (Command Detector) sub-circuit 412. The IIC sub-circuit 411 is configured to receive a control command sent by the main board and send the control command to the COM_DET sub-circuit 412, where the control command carries operation mode information. The COM_DET sub-circuit 412 is configured to analyze the received control command, determine an operation mode of the display apparatus, and send the operation mode to the image data selection circuit 12 and the backlight data selection circuit 23. The operation mode includes a writing mode and a non-writing mode. It should be noted that the mode analysis circuit may be a processor, and the IIC sub-circuit 411 and the COM_DET sub-circuit 412 may be implemented by a program stored in the processor.

In some examples, the data processing apparatus according to an embodiment of the present disclosure may include not only the above-described structure but also an image data transmission circuit 16 and a backlight data storage circuit 24. The image data transmission circuit 16 is configured to send frame image data (the first image data or the second image data), which is selected by the image data selection circuit 12 to be output, to the display panel. The image data transmission circuit 16 is generally denoted by TX, which is a transmitting interface of the VBO format. In this case, the image data transmission circuit 16 converts the received frame image data into a VBO format signal and sends the VBO format signal to the display panel. The backlight data storage circuit 24 is configured to store backlight data (the first backlight data or the second backlight data) output by the backlight data selection circuit 23, and then send the backlight data to the backlight source. The backlight data storage circuit 24 may be a random access memory.

In order to make the data processing apparatus according to the embodiment of the present disclosure clearer, two exemplary data processing apparatuses according to the present disclosure are specifically described below with reference to the structures shown in FIGS. 3 and 5.

As shown in FIG. 3, the data processing apparatus includes an image data receiving circuit 11, an image data cache circuit, an image data selection circuit 12, an image data transmission circuit 16, a backlight data calculation circuit 31, a touch information receiving circuit 21, a position analysis circuit 22, a backlight data selection circuit 23, a backlight data storage circuit 24, a mode analysis circuit, a first compensation circuit 13, and a second compensation circuit 15. The image data cache circuit includes a writing control sub-circuit 141, a memory, a memory control sub-circuit, and a reading/writing arbitration sub-circuit 143. The position analysis circuit 22 includes a first delay sub-circuit 221*a*, a first position information storage sub-circuit 222*a*, and a first division information acquiring sub-circuit 223*a*. The mode analysis circuit includes an TIC sub-circuit 411 and a COM_DET sub-circuit.

With continued reference to FIG. 3, the IIC sub-circuit 411 is configured to receive a control command sent by the main board and send the control command to the COM_DET sub-circuit 412, where the control command carries operation mode information; the COM_DET sub-circuit 412 is configured to analyze the received control command, determine the operation mode of the display apparatus, and send the operation mode to the image data selection circuit 12 and the backlight data selection circuit 23. When the operation mode selected by the user is the writing mode, after the touch information receiving circuit 21 receives the touch position information, the first delay sub-circuit 221*a* delays the touch position information by a predetermined number of frame periods and then sends the delayed touch position information to the first position information storage sub-circuit 222*a* for storage. The first division information acquiring sub-circuit 223*a* is configured to determine, according to the touch information stored by the first position information storage sub-circuit 222*a*, the backlight division information corresponding to the touch position information, that is, obtain first backlight data, and send the first backlight data to the backlight data selection circuit 23. Meanwhile, the main board generates first image data according to the touch position information and sends the first image data to the image data receiving circuit 11; the first compensation circuit 13 compensates the first image data according to the first backlight data, obtains first compensated image data, and sends the first compensated image data to the image data selection circuit 12. Then, the backlight data selection circuit 23 outputs the first backlight data to the backlight data storage circuit 24 for storage, and then outputs the first backlight data to the backlight-source-to-be-driven; the data selection circuit 12 selects and outputs the first compensated image data, and the image data transmission circuit 16 sends the first compensated image data to the display-panel-for-displaying. The VBO protocol serves for communication between the main board and the image data receiving circuit 11, and between the image data transmission circuit 16 and the display panel. When the user selects the non-writing mode, the main board generates second image data according to the data to be displayed, the image data receiving circuit 11 receives the second image data sent by the main board and pre-stores the second image data of a plurality of rows of pixels, and then the writing control sub-circuit writes the second image data of the plurality of rows of pixels into the memory. Meanwhile, the backlight data calculation circuit 31 acquires parameter information corresponding to the second image data according to the second image data received by the image data receiving circuit 11, and obtains corresponding second backlight data according to the parameter information corresponding to the image data, where the parameter information includes but is not limited to at least one of brightness, gray-scale value, and color of each pixel; then, the second compensation circuit compensates the second image data read out by the reading control sub-circuit according to the obtained second backlight data, to obtain second compensated image data, and sends the second compensated image data to the image data selection circuit 12, and the image data selection circuit 12 sends, through the image data sending circuit 16, the second compensated image data to the display panel for displaying. The backlight data calculation circuit 31 outputs the calculated second backlight data to the backlight data selection circuit 23, and the backlight data selection circuit 23 stores the obtained second backlight data in the backlight data storage circuit 24, and the backlight data storage circuit 24 sends the second backlight data to the backlight-source-to-be-driven.

It should be noted that the specific functions of the above circuits and sub-circuits are the same as those described above, and therefore, detailed descriptions thereof are omitted.

As shown in FIG. 5, the data processing apparatus has substantially the same configuration as that of the data processing apparatus described above, except that the position analysis circuit 22 includes a second delay sub-circuit 221*b*, a second position information storage sub-circuit 222*b*, and a second division information acquiring sub-circuit 223*b*. The second position information storage sub-circuit 222*b* stores the touch position information received by the touch information receiving circuit 21. The second division information acquiring sub-circuit 223*b* is configured to determine, according to the touch information stored by the second position information storage sub-circuit 222*b*, the backlight division information corresponding to the touch position information, and obtain first backlight data. The second delay sub-circuit 221*b* delays the first backlight data by a predetermined number of frame periods and then sends the first backlight data to the backlight data selection circuit 23, so that the backlight data selection circuit 23 sends the first backlight data to the backlight-source-to-be-driven. The reason why the first backlight data is required to be delayed by the predetermined frames of the first image data is that the first backlight data are acquired according to the first image data of the whole frame, so that the first backlight data are output after being delayed by the predetermined frames of the first image data, and the first backlight data and the first image data can be ensured to be output synchronously. The other parts of the data processing apparatus having such a structure is the same as those of the data processing apparatus of the above example, and therefore, the description thereof is omitted. An embodiment of the present disclosure further provides a data processing method, which can be implemented by any one of the data processing apparatuses. The data processing method in the embodiment of the present disclosure includes sending image data to a display-panel-for-displaying and sending backlight data to a backlight-source-to-be-driven.

In some examples, the data processing method in an embodiment of the present disclosure includes, in a writing mode, simultaneously sending first image data to a display-panel-for-displaying and first backlight data to a backlight-source-to-be-driven.

Figure 6:
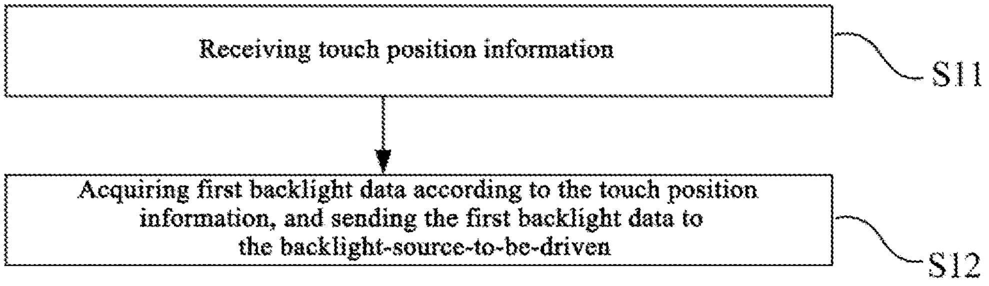
FIG. 6 is a flowchart of transmission of first backlight data in a writing mode in a data processing method according to an embodiment of the present disclosure.
Figure 7:
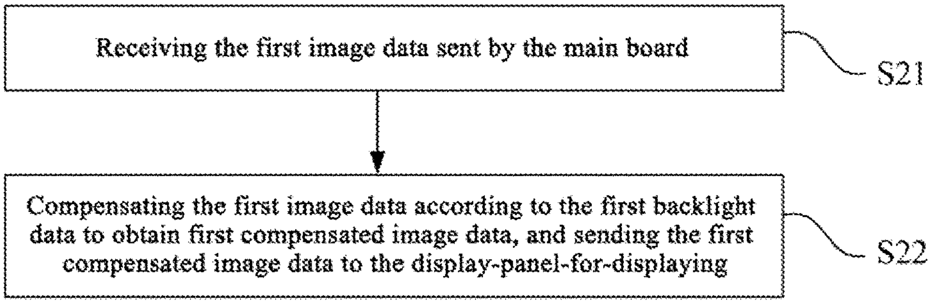
FIG. 7 is a flowchart of transmission of first image data in a writing mode in a data processing method according to an embodiment of the present disclosure.

FIG. 6 is a flowchart of transmission of first backlight data in a writing mode in a data processing method according to an embodiment of the present disclosure. As shown in FIG. 6, the step of sending the first backlight data to the backlight-source-to-be-driven in the writing mode includes steps S11 and S12.

S11, receiving touch position information.

For example, the touch component directly sends the touch position information to the touch information receiving circuit 21 of the data processing apparatus. For another example, the touch component sends the touch position information to the main board, and the main board sends the touch position information to the touch information receiving circuit 21 of the data processing apparatus.

S12, acquiring first backlight data according to the touch position information, and sending the first backlight data to the backlight-source-to-be-driven.

For example, step S12 may include steps S1211 to S1213.

S1211, delaying the touch position information by a second predetermined time, and storing the touch position information.

For example, step S1211 may include: by the first delay sub-circuit 221*a*, delaying the touch position information by the second predetermined time, and then sending the touch position information to the first position information storage sub-circuit 222*a* for storage.

The reason why the sending of the first backlight data are required to be delayed is that a certain time is needed when the first image data are generated at the main board end, so that the first image data received by the image data receiving circuit 11 is delayed, and the touch position information is delayed when being sent to the main board end, so that the sending of the first backlight data is delayed to be consistent with the sending of the first image data as far as possible. Therefore, the second predetermined time for delaying the sending of the touch position information is related to the time for generating the first image data by the main board according to the touch information; or the second predetermined time is related to the time for generating the first image data by the main board according to the touch information and the delay time for receiving the touch information by the main board. For a product, the time delay for touch is of a certain value.

Specifically, since the image data processing apparatus generally processes the image data and the backlight data in accordance with synchronization between frames of the image and the backlight, the delay time may be calculated in units of frame periods. Meanwhile, the first backlight data are obtained according to the whole frame of image data, and in the writing mode, the first backlight data are required to be obtained according to the whole frame of touch position information, so that the first backlight data are required to be delayed by a predetermined number of frame periods to be sent after the first backlight data and the first image data are synchronized. It can be understood that the second predetermined time is a second predetermined number of frame periods, which may be acquired by dividing the time for generating the first image data by the main board according to the touch information, by the frame period. The frame period for the first image data is fixed, so that the second predetermined time may be obtained by simply obtaining the time for generating the first image data by the main board according to the touch information. The acquisition of the second predetermined time of the delay may be obtained in the manner described above, and therefore is not described herein again.

S1212, determining backlight division information corresponding to the touch position information stored after being delayed by the second predetermined time, according to the touch position information, to obtain first backlight data.

For example, step S1212 may include: by the first division information acquiring sub-circuit 223*a*, determining the backlight division information corresponding to the touch position information according to the touch position information stored by the first position information storage sub-circuit 222*a*, and acquiring the backlight data corresponding to each backlight division, that is, obtaining the first backlight data, to be sent to the backlight data selection circuit 23.

S1213, sending the first backlight data to the backlight-source-to-be-driven.

For example, step S1213 may include: storing, by the backlight data selection circuit 23, the obtained first backlight data in the backlight data storage circuit 24, and sending, by the backlight data storage circuit 24, the first backlight data to the backlight-source-to-be-driven.

For example, step S12 may alternatively be implemented by employing steps S1221 to S1223.

S1221, storing the touch position information, and determining backlight division information corresponding to the touch position information according to the stored touch position information, to obtain first backlight data.

For example, step S1221 may include: by the second position information storage sub-circuit 222*b*, storing the received touch position information, such that the second division information acquiring sub-circuit 223*b* is configured to determine the backlight division information corresponding to the touch position information according to the touch information stored by the second position information storage sub-circuit 222*b*, to obtain the first backlight data.

S1222, delaying the first backlight data by a third predetermined time and then sending the first backlight data.

For example, step S1222 may include: the second delay sub-circuit 221*b* is configured to delay the first backlight data by the third predetermined time and then send the first backlight data to the backlight data selection circuit 23.

That is, in this example, it is necessary to send the first backlight data to the backlight data selection circuit 23 after the first backlight data are delayed by a predetermined time subsequent to being generated, to ensure that the first backlight data and the first image data are synchronously output, and the display delay is reduced.

Furthermore, during the predetermined time, for which the first backlight data are delayed after being generated and then are sent to the backlight data selection circuit 23, the main board may generate predetermined frames of the first image data. The reason why the delay for the predetermined frames of the first image data is required is that the first backlight data are obtained according to the first image data of the whole frame, so that the first backlight data are output after being delayed by the predetermined number of frame periods of the first image data, and the first backlight data and the first image data can be ensured to be synchronously output. That is, the third predetermined time is a predetermined number of frame periods.

S1223, sending the first backlight data to the backlight-source-to-be-driven.

For example, step S1223 may include: storing, by the backlight data selection circuit 23, the obtained first backlight data in the backlight data storage circuit 24, and sending, by the backlight data storage circuit 24, the first backlight data to the backlight-source-to-be-driven.

In some examples, in the writing mode, the step of sending the first backlight data to the backlight-source-to-be-driven may include: updating the first backlight data corresponding to the first image data of a previous frame according to the received touch position information, acquiring the first backlight data corresponding to current touch position information, and sending the first backlight data to the backlight-source-to-be-driven. That is to say, when the touch position information changes, only the first backlight data are updated, and the backlight data corresponding to each backlight division are not recalculated, so that the calculation amount can be greatly reduced, and the display delay can be reduced as much as possible.

For example, the above steps may be implemented by the position analysis circuit 22.

In an embodiment of the present disclosure, the step of sending the first image data to the display panel may specifically include steps S21 and S22.

S21, receiving the first image data sent by the main board.

For example, the first image data sent by the main board is received by the image data receiving circuit 11 in the data processing apparatus. The image data receiving circuit 11 and the main board are in communication connection with the VBO protocol.

S22, compensating the first image data according to the first backlight data to obtain first compensated image data, and sending the first compensated image data to the display-panel-for-displaying.

For example, step S22 may specifically include: by the first compensation circuit 13 in the data processing apparatus, compensating the first image data delayed by a first predetermined time with respect to the received touch position information, according to the first backlight data, to obtain the first compensated image data, sending the first compensated image data to the image data selection circuit 12, and by the image data selection circuit 12, selecting and outputting the first compensated image data to the image data sending circuit 16, so that the first compensated image data are sent to the display panel by the image data sending circuit 16. The image data transmission circuit 16 and the display panel communicate with each other with the VBO protocol. The first predetermined time is a first predetermined number of frame periods.

In some examples, the data processing method in an embodiment of the present disclosure includes not only the data processing method in the writing mode but also a data processing method in the non-writing mode. In the non-writing mode, the data processing method includes: sending the second image data to the display-panel-for-displaying and sending the second backlight data to the backlight-source-to-be-driven.

Figure 8:
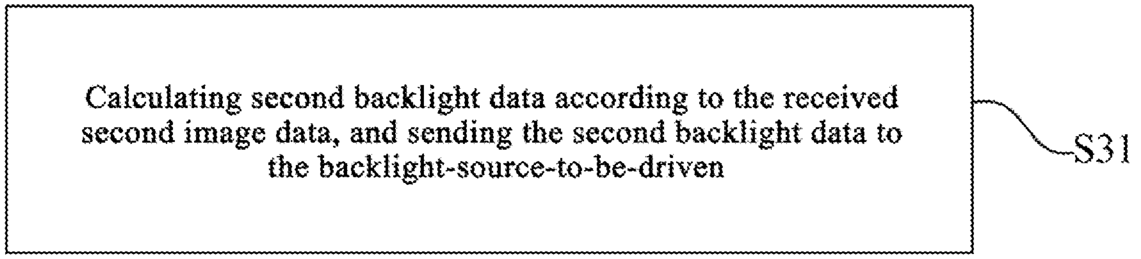
FIG. 8 is a flowchart of transmission of first backlight data in a non-writing mode in a data processing method according to an embodiment of the present disclosure.

FIG. 8 is a flowchart of transmission of second backlight data in a non-writing mode in a data processing method according to an embodiment of the present disclosure. As shown in FIG. 8, in the non-writing mode, the step of sending the second backlight data to the backlight-source-to-be-driven may specifically include step S31.

S31, calculating second backlight data according to the received second image data, and sending the second backlight data to the backlight-source-to-be-driven.

Figure 9:
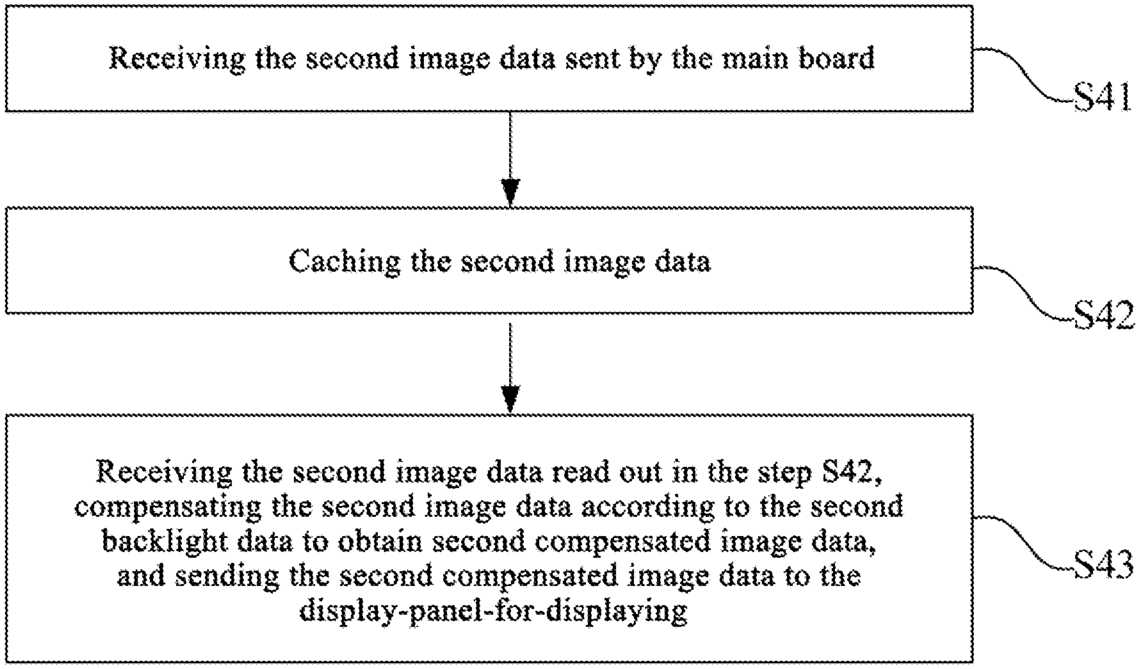
FIG. 9 is a flowchart of transmission of first image data in a non-writing mode in a data processing method according to an embodiment of the present disclosure.

For example, in the non-writing mode, the backlight data calculation circuit 31 in the data processing apparatus may obtain the backlight characteristic value corresponding to each backlight division according to the parameter information of pixels in the received second image data, for example, the gray-scale values of the pixels, and then calculate the backlight driving voltage values of respective divisions according to the backlight characteristic values of the respective divisions. It should be noted that one pixel region may include a plurality of pixels arranged in an array, one backlight division corresponds to one pixel region, and a correspondence between the backlight divisions and the pixel regions may be stored in the backlight calculation circuit in a form of a mapping table. Specifically, the backlight data calculation circuit 31 may include a backlight characteristic value calculation sub-circuit and a backlight driving voltage calculation sub-circuit. The backlight characteristic value calculation sub-circuit may obtain the backlight characteristic value through weighting an average value and a maximum value of the gray-scale values of the pixels in the pixel region corresponding to each backlight division, and the weights of the average value and the maximum value of the gray-scale values may be set according to the display scene. The backlight driving voltage calculating sub-circuit may calculate a backlight driving voltage value of each backlight division according to the obtained backlight characteristic value, that is, obtain the second backlight data, and output the second backlight data to the backlight data selection circuit 23 for output. FIG. 9 is a flowchart of transmission of second image data in a non-writing mode in a data processing method according to an embodiment of the present disclosure. As shown in FIG. 9, in the non-writing mode, the step of sending the second image data to the display-panel-for-displaying may specifically include steps S41 to S43.

S41, receiving the second image data sent by the main board.

For example, the second image data sent by the main board is received by the image data receiving circuit 11 in the data processing apparatus. The image data receiving circuit 11 and the main board are in communication connection with the VBO protocol.

S42, caching the second image data.

For example, when the second image data of the predetermined number of rows is received in step S41, the writing control sub-circuit 141 in the image data cache circuit in the data processing apparatus writes the image data of the predetermined number of rows received in step S41 into the memory, and then the reading control sub-circuit reads out the second image data in the memory.

The reason why the image is stored after the second image data of the predetermined number of rows are received in step S41 is that the image data cache circuit may employ a device, including but not limited to, DDR3, which has a high speed of reading data.

S43, receiving the second image data read out in the step S42, compensating the second image data according to the second backlight data to obtain second compensated image data, and sending the second compensated image data to the display-panel-for-displaying.

For example, the second compensation circuit 15 in the data processing apparatus receives the second image data read out by the image data cache circuit, and in this case, compensates the second image data according to the second backlight data calculated by the backlight data calculation circuit, so that the second compensated image data may be obtained. The second image data are compensated according to the second backlight data, and the compensated image data serves as an input of each pixel in the display panel, so that the display quality of the display panel can be effectively improved.

In some examples, the data processing method in the embodiment of the present disclosure includes not only the foregoing steps but also step S01 of analyzing the operation mode and sending the operation mode to the image data selection circuit 12 and the backlight data selection circuit 23.

For example, the mode analysis circuit in the data processing apparatus includes an IIC sub-circuit 411 and a COM_DET sub-circuit 412. The TIC sub-circuit 411 receives a control command sent by the main board and sends the control command to the COM_DET sub-circuit 412, where the control command carries operation mode information. The COM_DET sub-circuit 412 analyzes the received control command, determines the operation mode of the display apparatus, and sends the operation mode to the image data selection circuit 12 and the backlight data selection circuit 23. When the operation mode selected by the user is the writing mode, steps S11 to S12 and steps S21 to S22 are performed; and when the operation mode selected by the user is the non-writing mode, steps S31 to S13 and step S41 are performed.

Since the image data transmission method provided by the embodiment of the present disclosure employs the image data processing apparatus described above, zero-delay output of backlight data and image data can be realized in the writing mode, so that the display image quality can be effectively improved.

Figure 10:
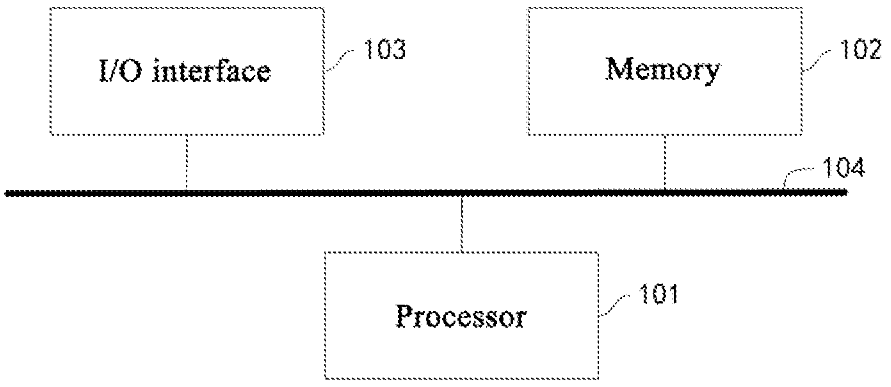
FIG. 10 is a schematic diagram illustrating a structure of an electronic device according to an embodiment of the present disclosure.

FIG. 10 is a schematic diagram illustrating a structure of an electronic device according to an embodiment of the present disclosure. As shown in FIG. 10, an embodiment of the present disclosure provides an electronic device including one or more processors 101, a memory 102, and one or more I/O interfaces 103. The memory 102 stores one or more programs that, when executed by the one or more processors, cause the one or more processors to implement the data processing method in any one of the above embodiments. The one or more I/O interfaces 103 are coupled between the processor and the memory, and are configured to enable information interaction between the processor and the memory.

The processor 101 is a device with data processing capability, which includes but is not limited to a central processing unit (CPU), or the like. The memory 102 is a device having data storage capabilities including, but not limited to, random access memory (RAM, more specifically SDRAM, DDR, or the like), read only memory (ROM), electrically erasable programmable read only memory (EEPROM), flash memory (FLASH). The I/O interface (reading/writing interface) 103 coupled between the processor 101 and the memory 102 may enable information interaction between the processor 101 and the memory 102, which may include, but is not limited to, a data bus (Bus), or the like.

In some embodiments, the processor 101, the memory 102, and the I/O interface 103 are connected to each other through a bus 104, and in turn to other components of the computing device.

In some embodiments, the one or more processors 101 include a field programmable gate array.

According to an embodiment of the present disclosure, a non-transitory computer readable medium is further provided. The non-transitory computer readable medium stores thereon a computer program which, when being executed by a processor, implements steps in any one data processing method in the above embodiments.

Figure 11:
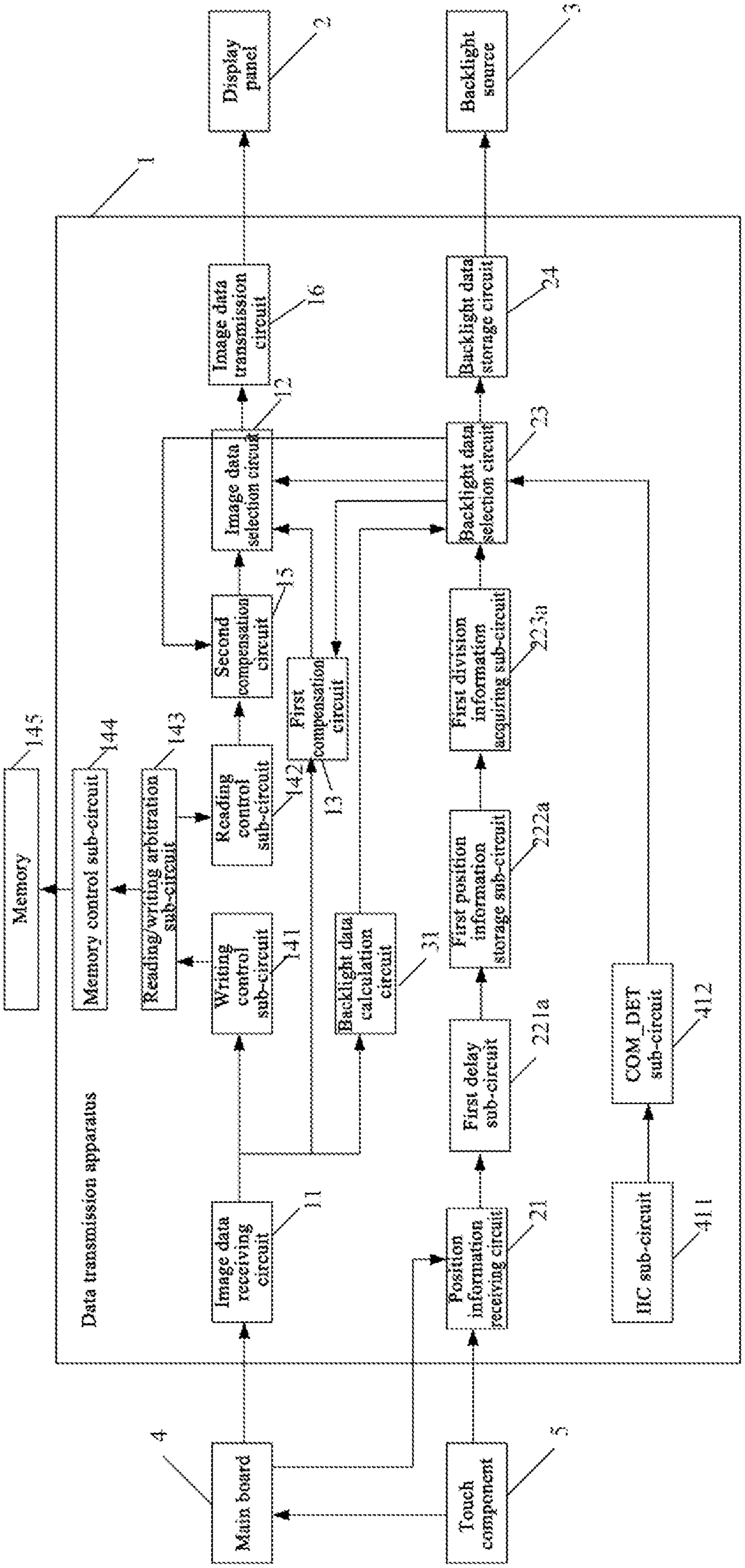
FIG. 11 is a schematic diagram illustrating a structure of a smart interactive tablet according to an embodiment of the present disclosure.

FIG. 11 is a schematic diagram illustrating a structure of a smart interactive tablet according to an embodiment of the present disclosure. As shown in FIG. 11, an embodiment of the present disclosure further provides a smart interactive tablet, which includes the data processing apparatus 1 described above, a display panel 2, a backlight source 3, a main board 4, and a touch component 5. Due to the data processing apparatus 1 in the embodiment of the present disclosure, zero-delay output of the first backlight data and the first image data can be realized in the writing mode, so that display image quality can be effectively improved.

In some examples, the touch component 5 is configured to send the touch position information to the data processing apparatus 1, alternatively is configured to send the touch position information to the main board 4, and the main board 4 is configured to send touch position information to the data processing apparatus 1. The main board 4 is configured to send image data to the data processing apparatus 1, where the image data includes the first image data and the second image data mentioned in the above example. The main board 4 is configured to send mode information to the data processing apparatus 1, so that the data processing apparatus 1 can analyze the operation mode, where the operation mode includes a writing mode and a non-writing mode. In some examples, the touch component 5 may be a capacitive touch component or an infrared touch component, or the like; and the display panel can be a liquid crystal panel, a mobile phone, a tablet computer, or the like.

In particular, according to an embodiment of the present disclosure, the process described above with reference to the flow chart may be implemented as a computer software program. For example, an embodiment of the present disclosure includes a computer program product including a computer program carried on a machine readable medium, where the computer program includes program codes for performing the method illustrated by the flow chart. In such an embodiment, the computer program may be downloaded and installed from a network via a communication part, and/or installed from a removable medium. The above functions defined in the system of the present disclosure are performed when the computer program is performed by a Central Processing Unit (CPU).

It should be noted that the computer readable medium shown in the present disclosure may be a computer readable signal medium, a computer readable storage medium, or any combination of the two. A computer readable storage medium may be, for example, but not limited to, an electronic, magnetic, optical, electromagnetic, infrared, or semiconductor system, apparatus, or device, or any combination thereof. More specific examples of the computer readable storage medium may include, but are not limited to, an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, a computer readable storage medium may be any tangible medium that contains or stores a program, which can be used by or in connection with an instruction execution system, apparatus, or device. In contrast, in the present disclosure, a computer readable signal medium may include a propagated data signal with computer readable program code carried therein, in a baseband or as a part of a carrier wave. Such a propagated data signal may take any of a variety of forms, including, but not limited to, electromagnetic signal, optical signal, or any suitable combination thereof. A computer readable signal medium may also be any computer readable medium other than a computer readable storage medium, which may transmit, propagate, or convey a program for use by or in connection with an instruction execution system, apparatus, or device. The program codes on the computer readable medium may be conveyed by any appropriate medium, including but not limited to wireless, a wire, fiber optic cable, RF, or the like, or any suitable combination thereof.

The flowchart and block diagram in the figures illustrate an architecture, functionality, and operation possibly implemented by the system, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the function noted in the block may occur in a different order from that noted in the figures. For example, two blocks shown in succession may, in fact, be executed substantially concurrently, or the blocks may sometimes be executed in a reverse order, depending upon the functionality involved. It should also be noted that each block in the block diagram and/or the flowchart, and combinations of blocks in the block diagram and/or the flowchart, may be implemented by a special purpose hardware-based system that performs the specified function or act, or by a combination of a special purpose hardware and computer instructions.

A circuit or sub-circuit described in the embodiment of the present disclosure may be implemented by a software or a hardware. The described circuit or sub-circuit may alternatively be arranged in a processor, for example, may be described as: a processor, including a receiving circuit and a processing circuit, where the processing circuit includes a writing sub-circuit and a reading sub-circuit. The designation of such circuit or sub-circuit does not in some cases constitute a limitation on the circuit or sub-circuit itself, for example, the receiving circuit may alternatively be described as "receiving a video signal".

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and essence of the present disclosure, and such modifications and improvements are also considered to be within the scope of the present disclosure.

What is claimed is:

1. A data processing apparatus, wherein an operation mode of the data processing apparatus comprises a first mode; the data processing apparatus comprises an image data receiving circuit, a touch information receiving circuit, a position analysis circuit, a backlight data selection circuit and an image data selection circuit; wherein in the first mode:

the image data receiving circuit is configured to receive first image data sent by a main board;

the touch information receiving circuit is configured to receive touch position information;

the position analysis circuit is configured to acquire backlight division information corresponding to the touch position information, according to the touch position information, to obtain first backlight data;

the backlight data selection circuit is configured to select and output the first backlight data to a backlight-source-to-be-driven; and the image data selection circuit is configured to output first compensated image data to a display-panel-for-displaying; wherein the first compensated image data are data obtained by compensating the first image data according to the first backlight data.

2. The data processing apparatus according to claim 1, further comprising a first compensation circuit; wherein in the first mode:

the first compensation circuit is configured to compensate the first image data delayed by a first predetermined time with respect to the received touch position information, according to the first backlight data, to obtain the first compensated image data.

3. The data processing apparatus according to claim 2, wherein the first predetermined time is a first predetermined number of frame periods.

4. The data processing apparatus according to claim 1, wherein the touch information receiving circuit is configured to receive the touch position information sent by the main board.

5. The data processing apparatus according to claim 1, wherein the touch information receiving circuit is configured to receive the touch position information sent by a touch component.

6. The data processing apparatus according to claim 1, wherein the position analysis circuit comprises:

a first delay sub-circuit configured to delay the touch position information received by the touch information receiving circuit by a second predetermined time, and then send the touch position information;

a first position information storage sub-circuit configured to receive and store the touch position information sent by the first time delay sub-circuit; and a first division information acquiring sub-circuit configured to determine the backlight division information corresponding to the touch position information according to the touch information stored by the first position information storage sub-circuit, to obtain the first backlight data, such that the backlight data selection circuit outputs the first backlight data to the backlight-source-to-be-driven.

7. The data processing apparatus according to claim 6, wherein the second predetermined time is a second predetermined number of frame periods; and the first delay sub-circuit is configured to delay the touch position information received by the touch information receiving circuit by the second predetermined number of frame periods, and then send the touch position information.

8. The data processing apparatus according to claim 6, wherein the first delay sub-circuit comprises a FIFO memory.

9. The data processing apparatus according to claim 1, wherein the position analysis circuit comprises:

a second position information storage sub-circuit configured to store the touch position information received by the touch information receiving circuit;

a second division information acquiring sub-circuit is configured to determine the backlight division information corresponding to the touch position information according to the touch position information stored by the position information storage sub-circuit, to obtain the first backlight data; and a second delay sub-circuit is configured to delay the first backlight data by a third predetermined time, and then send the first backlight data to the backlight data selection circuit.

10. The data processing apparatus according to claim 9, wherein the third predetermined time is a third predetermined number of frame periods; and the second delay sub-circuit is configured to delay the first backlight data by the third predetermined number of frame periods and then send the delayed first backlight data to the backlight data selection circuit.

11. The data processing apparatus according to claim 9, wherein the second delay sub-circuit comprises a FIFO memory.

12. The data processing apparatus according to claim 1, wherein the position analysis circuit is configured to update the first backlight data corresponding to the first image data of a previous frame, according to the touch position information, and acquire the backlight division information corresponding to the touch position information, to obtain the first backlight data corresponding to the touch position information.

13. The data processing apparatus according to claim 1, wherein the operation mode of the data processing apparatus further comprise a second mode, and the data processing apparatus further comprises an image data cache circuit;

in the second mode: the image data receiving circuit is further configured to receive second image data sent by the main board;

the image data cache circuit is configured to cache the second image data; and the image data selection circuit is further configured to output second compensated image data to the display-panel-for-displaying; wherein the second compensated image data are obtained by compensating the second image data according to second backlight data; and the second backlight data are calculated according to the second image data received by the image data receiving circuit.

14. The data processing apparatus according to claim 13, further comprising a second compensation circuit; wherein in the second mode:

the second compensation circuit is configured to compensate the second image data read out by the image data cache circuit, according to the second backlight data, to obtain the second compensated image data.

15. The data processing apparatus according to claim 13, wherein the image data cache circuit comprises:

a writing control sub-circuit configured to receive the second image data and write the second image data into a memory; and a reading control sub-circuit configured to read the second image data in the memory, such that the image data selection circuit outputs the second compensated image data.

16. The data processing apparatus according to claim 13, further comprising a backlight data calculation circuit, wherein the backlight data calculation circuit is configured to calculate the second backlight data, according to the second image data received by the image data receiving circuit, and send the second backlight data to the backlight data selection circuit, such that the backlight data selection circuit outputs the second backlight data to the backlight-source-to-be-driven.

17. The data processing apparatus according to claim 16, wherein the backlight data calculation circuit comprises:

a backlight characteristic value calculation sub-circuit configured to, in the second mode, acquire gray-scale value of respective pixels according to the second image data received by the image data receiving circuit, and obtain a backlight characteristic value of each backlight division corresponding to a pixel region, according to the gray-scale values of the pixels in the pixel region; and a backlight driving voltage calculation sub-circuit is configured to calculate a backlight driving voltage value of a light source in each backlight division according to the backlight characteristic value, to obtain the second backlight data, and output the second backlight data to the backlight data selection circuit for output.

18. The data processing apparatus according to claim 1, further comprising:

a mode analysis circuit configured to receive and analyze mode information sent by the main board, to obtain the operation mode of the display apparatus.

19. A data processing method, comprising: in a first mode, sending first image data to a display-panel-for-displaying, and simultaneously sending first backlight data to a backlight-source-to-be-driven; wherein in the first mode, the sending the first image data to the display-panel-for-displaying, comprises:

receiving the first image data sent by a main board; and compensating the first image data according to the first backlight data, to obtain first compensated image data, and sending the first compensated image data to the display-panel-for-displaying; and in the first mode, the sending the first backlight data to the backlight-source-to-be-driven, comprises:

receiving touch position information; and acquiring backlight division information corresponding to the touch position information, according to the touch position information, to obtain the first backlight data, and sending the first backlight data to the backlight-source-to-be-driven.

20. A smart interactive tablet, comprising:

a main board, a data processing apparatus, a display panel, a touch component and a backlight source, wherein the image data processing apparatus employs the image data processing apparatus according to claim 1.

* * * * *